US011195630B2

(12) United States Patent
Cinotti

(10) Patent No.: US 11,195,630 B2
(45) Date of Patent: Dec. 7, 2021

(54) NUCLEAR REACTOR WITH FUEL ELEMENTS PROVIDED WITH EXPANDERS

(71) Applicant: HYDROMINE NUCLEAR ENERGY S.A.R.L., Luxembourg (LU)

(72) Inventor: Luciano Cinotti, Recco (IT)

(73) Assignee: HYDROMINE NUCLEAR ENERGY S.A.R.L., Luxembourg (LU)

( * ) Notice: Subject to any disclaimer, the term of this patent is extended or adjusted under 35 U.S.C. 154(b) by 328 days.

(21) Appl. No.: 16/098,064

(22) PCT Filed: May 4, 2017

(86) PCT No.: PCT/IB2017/052609
§ 371 (c)(1),
(2) Date: Oct. 31, 2018

(87) PCT Pub. No.: WO2017/191596
PCT Pub. Date: Nov. 9, 2017

(65) Prior Publication Data
US 2020/0328001 A1 Oct. 15, 2020

(30) Foreign Application Priority Data
May 4, 2016 (IT) .................. 102016000045600

(51) Int. Cl.
*G21C 7/30* (2006.01)
(52) U.S. Cl.
CPC ...................... *G21C 7/30* (2013.01)
(58) Field of Classification Search
CPC ... G21C 7/30; G21C 5/06; G21C 3/02; G21C 3/12; G21C 3/14; G21C 1/02; G21C 1/03
See application file for complete search history.

(56) References Cited

U.S. PATENT DOCUMENTS 3,600,276 A    8/1971   Nims
3,661,708 A *  5/1972   Friedland ................. G21C 7/30
                                                              376/261
(Continued)

FOREIGN PATENT DOCUMENTS

EP    2674948 A1    12/2013
GB    1176646 A      1/1970
GB    1176646 A *    1/1970    ............... G21C 7/30

OTHER PUBLICATIONS

International Search Report and Written Opinion for International Application No. PCT/IB2017/052609 dated Aug. 2, 2017.
(Continued)

*Primary Examiner* — Jack W Keith
*Assistant Examiner* — Joshua C Devorkin
(74) *Attorney, Agent, or Firm* — Marcus S. Simon

(57) ABSTRACT

The present invention concerns a nuclear reactor, preferably a pool-type nuclear reactor cooled by liquid metal or molten salts, having a core formed of a bundle of fuel elements and immersed in a primary fluid for cooling the core; the fuel elements are provided with expanders acting in a direction perpendicular to the axes of the fuel elements and having low thermal expansion elements which engage alternatively with high thermal expansion elements to amplify the radial expansion of respective end elements which, when a predetermined temperature is exceeded, engage with each other and space the fuel elements from one another and in particular their active part to introduce negative reactivity into the core.

13 Claims, 6 Drawing Sheets

(56) References Cited

U.S. PATENT DOCUMENTS

| | | | | |
|---|---|---|---|---|
| 3,831,396 A | * | 8/1974 | Donaldson | G21C 15/02 |
| | | | | 62/467 |
| 4,131,510 A | * | 12/1978 | Cooper | G21C 7/30 |
| | | | | 376/302 |
| 4,135,974 A | * | 1/1979 | Garkisch | G21C 1/02 |
| | | | | 376/302 |
| 4,152,207 A | | 5/1979 | Cooper | |
| 4,851,186 A | * | 7/1989 | Berte | G21C 5/06 |
| | | | | 376/364 |

OTHER PUBLICATIONS

Italian Application No. GE2015A000036 filed Jul. 13, 2016.

* cited by examiner

NUCLEAR REACTOR WITH FUEL ELEMENTS PROVIDED WITH EXPANDERS

TECHNICAL FIELD

The present invention concerns a nuclear reactor, in particular a nuclear reactor consisting of several fuel elements characterized by an expansion system which, as the temperature increases, spaces the top of relative active parts characterized by a system of constraints and rigidities of relative component parts, such as to make said spacing mechanically possible.

PRIOR ART

In the particular case of fast reactors cooled by using liquid metals as a primary coolant, the reactivity of the core is closely linked to the geometry: the reactivity increases if the core is compacted and decreases if the core expands.

Also in the choice of materials, their capacity to expand with temperature is normally taken into account to enhance the effects of neutron counter-reactions.

The use of bimetallic elements arranged parallel to the axis of the fuel element to amplify arching of the same in a predetermined direction as the temperature increases is known in particular from GB1176646A. However, a device of this type has the drawback that also during assembly the direction of the fuel element in the core established at the design stage must be observed (so that, in use, the arching does not occur in the opposite direction to the one desired: an assembly error therefore produces the opposite result to the one desired); furthermore, rotations of the fuel element are not permitted, whereas rotations are often performed during fuel replacement operations (refueling) to minimize arching of the fuel element due to the different neutron damage of two opposite parts of the element.

It is also important for the fuel elements to be loaded in the core without leaving space between them in order to prevent them moving closer together, resulting in uncontrolled increase in reactivity during operation.

On the other hand it is known that, during operation of the reactor, the fuel is subject to deformations and swelling which can make refueling problematic if the fuel elements are not assembled with a minimum distance from one another. In the design of the core it is therefore necessary to seek the best compromise between two opposite needs.

SUBJECT OF THE INVENTION

One object of the present invention is to provide a nuclear reactor that overcomes the drawbacks highlighted of the known solutions and has further construction and safety advantages.

The present invention therefore concerns a nuclear reactor, as defined in the attached claim 1, with its ancillary characteristics and plant configurations defined in the dependent claims.

BRIEF DESCRIPTION OF THE DRAWINGS

The invention is described in the following non-limiting embodiment example, with reference to the figures of the attached drawings, in which.

PREFERRED EMBODIMENT OF THE INVENTION

Figure 1:
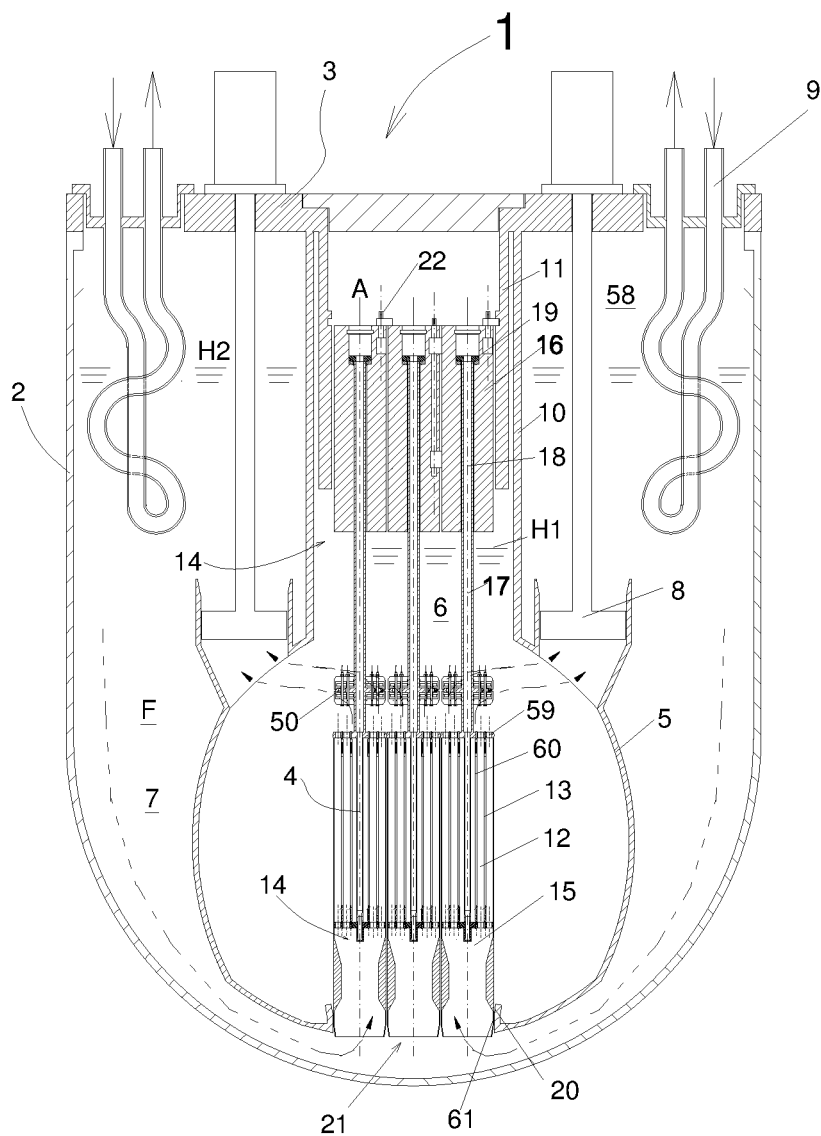
FIG. 1 is an overall schematic view in longitudinal section of a nuclear reactor according to the invention.

With reference to FIG. 1, which shows in particular a nuclear reactor 1 of the pool type cooled by liquid metal or molten salts, the nuclear reactor 1 comprises a vessel 2 which is substantially cup- or pool-shaped and a closing structure 3 positioned above the vessel 2; the vessel 2 contains a core 4 and a hydraulic separation structure 5 delimiting a hot manifold 6 and a cold manifold 7 in which a primary cooling fluid F circulates for cooling the core 4. The primary fluid F has a free surface which in normal operation of the reactor 1 is at different levels H1, H2 in the manifolds 6,7. Inside the vessel 2, circulation pumps 8 are housed for circulating the primary fluid F, heat exchangers 9, through which the primary fluid F flows to transfer the power generated in the core 4 to a secondary fluid, and other components which are known and not illustrated.

The hydraulic separation structure 5 preferably has an amphoralike shape, according to the solution known from patent application GE2015A000036, and is suspended from the closure structure 3 of the vessel 2.

Figure 2:
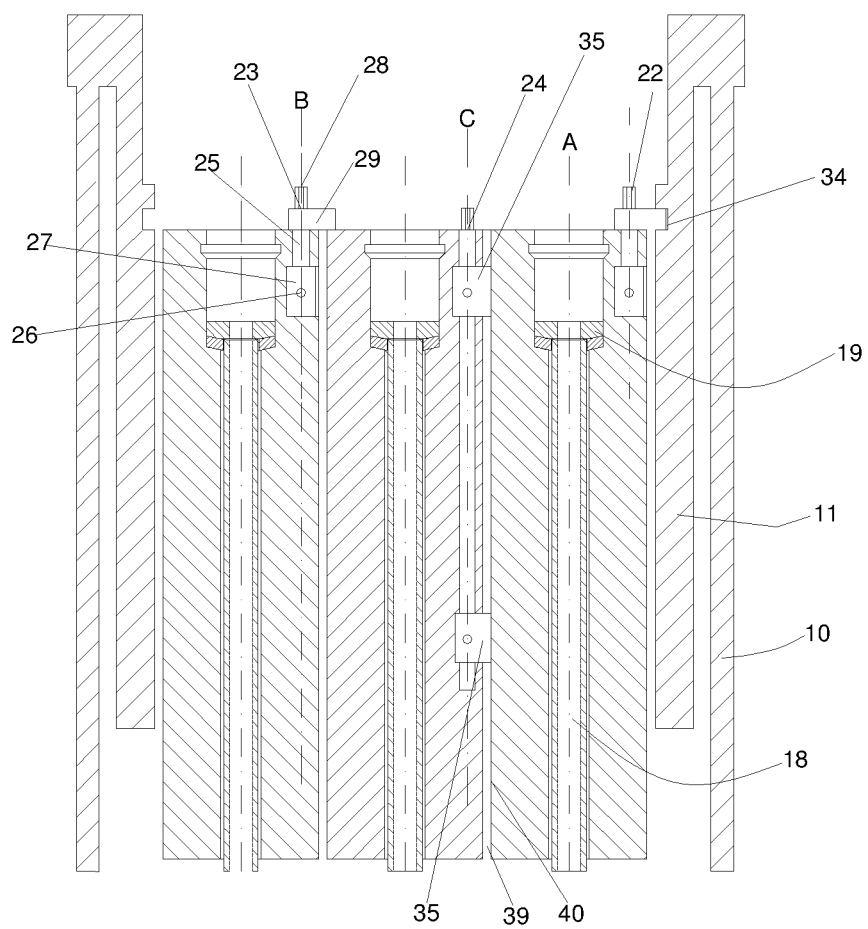
FIG. 2 is an enlarged schematic view in longitudinal section of a detail of the nuclear reactor of FIG. 1, in particular of a support system for the fuel elements of the nuclear reactor.
Figure 3:
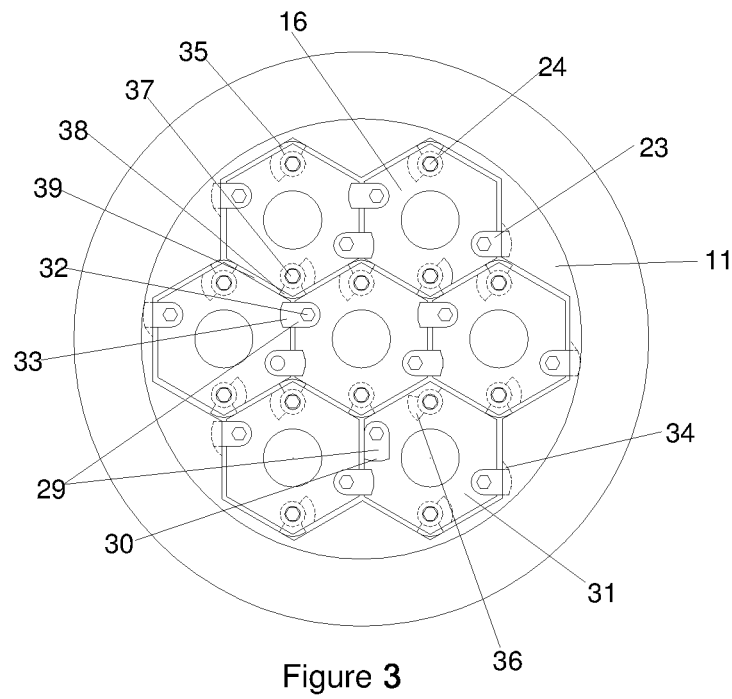
FIG. 3 is an overhead schematic view of the support system of the fuel elements of FIG. 2.

With reference also to FIGS. 2 and 3, inside the upper part of the hydraulic separation structure 5 an anchoring structure 11 is inserted for anchoring the fuel elements 12.

The fuel elements 12 extend along respective parallel longitudinal axes A and have respective active parts 13 and respective service parts 14 which comprise a foot 15 and a head 16 at the bottom and top respectively of the fuel element (i.e. located at a lower axial end and at an upper axial end of the fuel element 12 respectively) and a connection shaft 17 between the active part 13 and the head 16.

The shaft 17 is provided with a certain mechanical flexibility and an upper portion 18 thereof is inserted in an empty cylindrical volume inside the head 16 of the fuel element 4. Said upper portion 18 is mechanically coupled with the head 16 by means of a spherical coupling 19 not described in detail, since it is known in the art, positioned at its upper end.

The feet 15 of the fuel elements 12 are in contact with one another and, as a whole, constitute a pack radially constrained by means of the inner rim 20 of the opening 21 on the bottom of the hydraulic separation structure 5.

On the head 16 of the fuel element 12, near two opposite edges of the hexagonal section of the head 16, support devices 22 are housed, in particular two vertical support devices 23 and two horizontal support devices 24 near further two opposite edges of the head 16.

The vertical support devices 23 consist of a substantially cylindrical main body 25 with the bottom end connected by means of a pin 26 to a vertically locking hollow cylindrical element 27. The main body 25 of the support element terminates at the top in a hexagonal head 28 and comprises a latch 29.

The vertical support devices 23 can rotate by approximately 90° around their own axis B, to switch from a closed position 30 in which their projection on a horizontal plane is contained entirely within the projection 31 of the head 16 of respective fuel elements 12, to an open position 32, represented by all the other vertical support devices 23 of FIG. 3, in which the latch 29 protrudes from the projection 31 of the head 16 of respective fuel elements 12 to bring the terminal part 33 above the adjacent fuel element 12 or, limited only to the peripheral devices of the peripheral fuel elements 12 of the core, to engage in a slot 34 obtained on the anchoring structure 11 of the fuel elements 12. The vertical support devices 23 belonging to the fuel element 12 in the opening position 32 prevent downward movement of said fuel element 12 which, with said latches 29 open, rests on the adjacent fuel elements 12. The vertical support devices 23 which from adjacent fuel elements 12 project above a certain fuel element 12 prevent the upward movement of said fuel element 12.

With all the support devices 23 in the open position, the core 4 becomes one single block where no fuel element 12 can move up or down with respect to the others. The vertical support devices 23, which are in a peripheral position of the core and in an open position and which engage the slots 34 of the anchoring structure 11 of the fuel elements 12, furthermore prevent vertical movements of the entire core 4.

The horizontal support devices 24 are also substantially cylindrical in shape and characterized by at least two cams 35 and can rotate more than 90° around their own axis C, from a closed position 36 in which their projection on a horizontal plane is contained entirely within the projection 31 of the head 16 of the respective fuel element 12, to an open position 37, represented by all the other horizontal support devices 24 of FIG. 3, in which the cam 35 protrudes from said projection 31 to bring a terminal part thereof 38 beyond the gap 39 between the heads 16 of the fuel elements 12, until contact is established with two heads 16, in particular with one of their respective faces 40 or, limited only to the peripheral fuel elements 12, contact with the anchoring structure 11 of the fuel elements 12.

The vertical support devices 23 perform the function already described of vertical constraint of the fuel elements, while the horizontal support devices 24 perform, as a whole, the function of radial constraint of the heads 16 of the fuel elements when a gap 39 is provided between them.

With all the support devices 22 in the open position, the core becomes one single block vertically and radially anchored to the anchoring structure 11.

Figure 4:
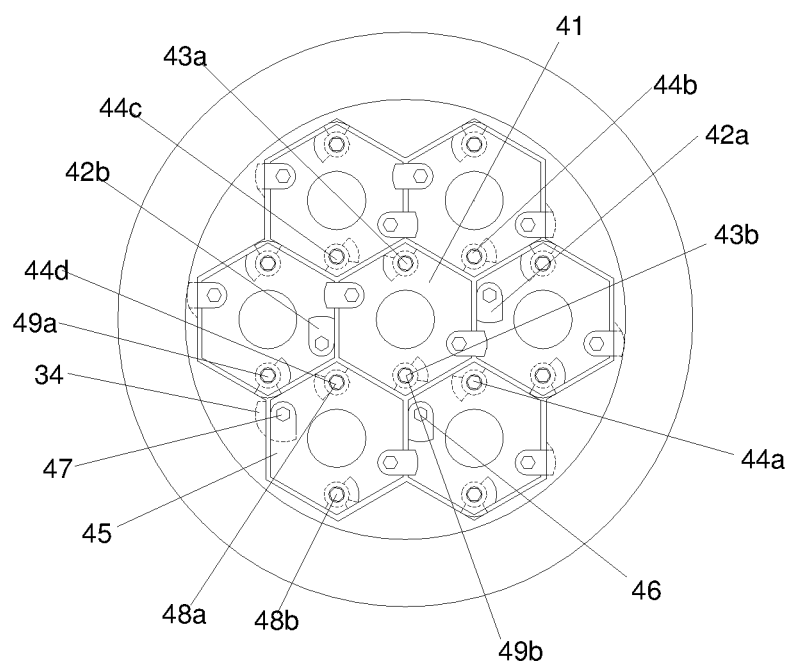
FIG. 4 is an overhead schematic view of the support system of the fuel elements of FIG. 2 shown in a configuration with a fuel element released for refueling.

With reference to FIG. 4, extraction of a generic internal fuel element 41 of the core can be performed: (i) after closing the two vertical support devices 42a and 42b belonging to adjacent fuel elements, (ii) after closing the two horizontal support devices 43a and 43b belonging to the same fuel element 41 and (iii) after closing the four horizontal support devices 44a, 44b, 44c, 44d belonging to four adjacent elements.

Extraction of a generic external fuel element 45 of the core can be performed (i) after closing a vertical support device 46 belonging to an adjacent element, (ii) closing its vertical support device 47 which engages in the groove 34 obtained on the anchoring structure 11 of the fuel elements 12, (iii) after closing the two horizontal support devices 48a and 48b belonging to the same fuel element 45 and (iv) after closing the two horizontal support devices 49a, 49b belonging to two adjacent elements.

The rotation limits for closing and opening the horizontal support devices 24 can be determined by the shape of the slots 34 occupied by the latches on the head 16 of the elements 12.

Opening and closing of the support devices 22 can be performed by acting on the hexagonal head 28 via the gripper of the fuel transfer machine or by means of an appropriate device or remote manipulator not illustrated being known in the art.

By an analogous extraction and insertion procedure it is also possible to rotate the fuel element by 180°.

What is described for the fuel element support can be applied to other components inserted in the core such as the control rods.

Figures 5A, 5B:
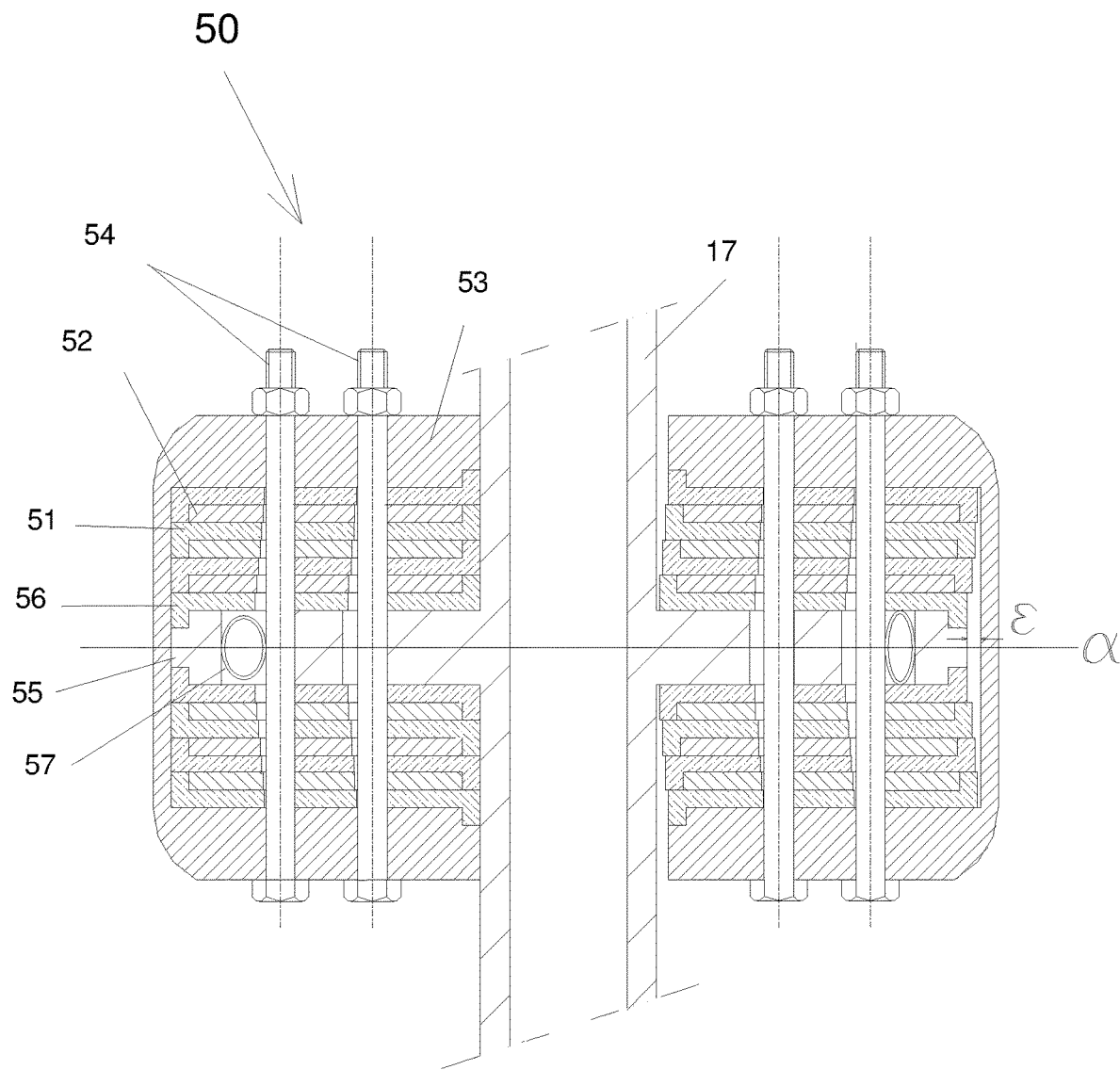
FIGS. 5a 5b are schematic views on an enlarged scale in longitudinal section of a further detail of the nuclear reactor of FIG. 1 and show in particular a radial expander in a cold assembly configuration and hot expanded position respectively, corresponding to active parts of the fuel elements side-by-side and spaced respectively.
Figure 6A:
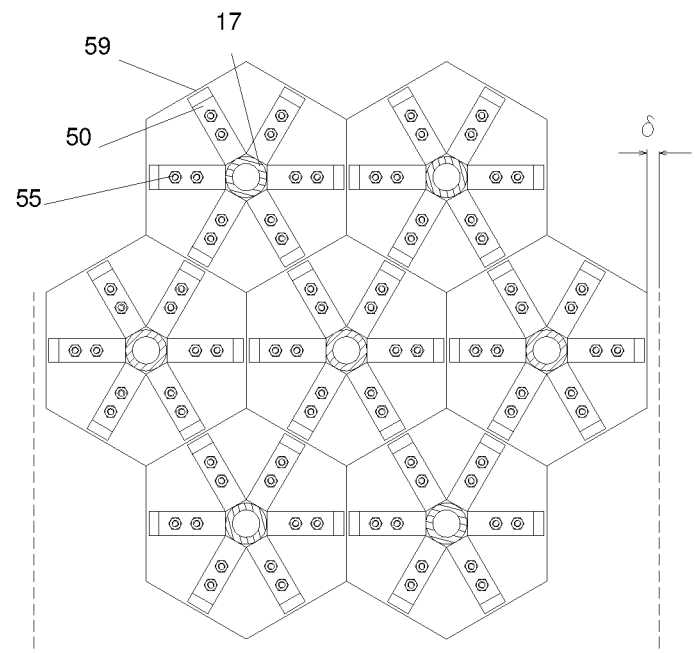
FIGS. 6a and 6b are schematic views in cross section according to trace I-I of the fuel elements of the nuclear reactor of FIG. 1, shown with the active parts of the fuel elements side-by-side and spaced respectively.
Figure 6B:
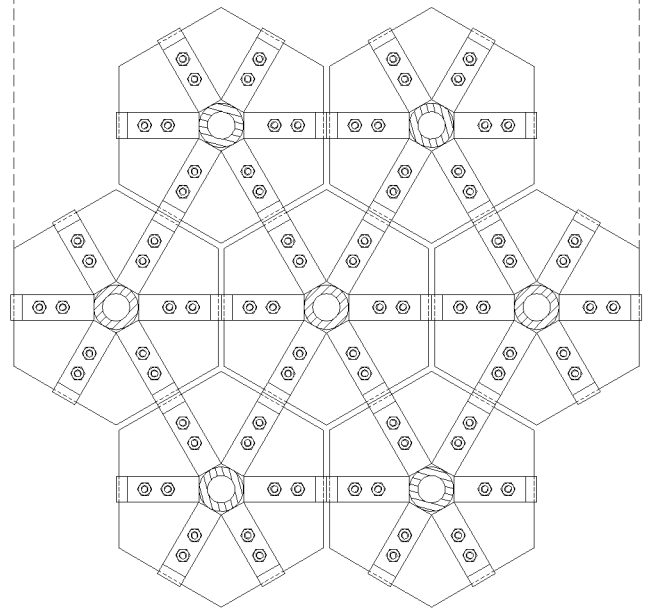

With reference to FIGS. 1, 5a, 5b, 6a and 6b on the shaft 17 of the fuel elements 12, expanders 50 are applied characterized by an increased radial expansion capacity with the temperature, an embodiment example of which is given in FIGS. 5a, 5b.

Each shaft 17, i.e. each fuel element 12, is provided with a plurality of expanders 50 (in the example shown, six expanders 50) positioned radially around the shaft 17 and angularly (circumferentially) spaced around the shaft 17, i.e. around the axis A of the corresponding fuel element 12, with axial-symmetric arrangement with respect to the axis A.

Each expander 50 projects radially from the shaft 17; in the example shown, each expander 50 has a development perpendicular to a respective face 40 of the fuel element 12. Each expander 50, which for improved structural performance is symmetrical with respect to a middle plane a perpendicular to the shaft 17 and to the axis A, comprises a plurality of low thermal expansion elements 51, made of zircaloy for example, substantially Z-shaped, and a plurality of high thermal expansion elements 52, made of Mn72Cu18Ni10 alloy for example, substantially in the shape of a parallelepiped. The low thermal expansion elements 51 and the high thermal expansion elements 52 are alternated axially along the shaft 17 (i.e. parallel to the axis A): each element 52 is axially interposed between two axially adjacent elements 51.

The elements 51 have a thermal expansion coefficient lower than the elements 52. In other words, the elements 51 are made of a first material having a first thermal expansion coefficient and the elements 52 are made of a second material having a second thermal expansion coefficient, greater than the first thermal expansion coefficient.

Each expander 50 also comprises a terminal closing element 53, also made of material with a high thermal expansion coefficient; the element 53, having a U shape for example, covers the elements 51, 52 and has two (or more) bolts 54 (or other fastening members) which axially secure the various elements 51, 52 of the expander 50 and prevent disassembly thereof due to radial displacements away from the shaft 17. The terminal element 53 projects radially outside the elements 51, 52.

The shaft 17 is provided, for each expander 50, with a radial extension 55 which projects radially from the shaft 17 and has a radially external end (opposite a radially internal end, joined to the shaft 17) which engages a radially external terminal part 56, axially bent, of the low thermal expansion element 51, the latter being axially more internal (i.e. nearer to the middle plane a and to the radial extension 55); on a radially internal end of said element, a first high thermal expansion element 52 engages, having a radially external end which in turn engages the radially external terminal part 56 of a second element 51, and so on.

Following an increase in temperature, the high thermal expansion elements 52 elongate more than the low thermal expansion element 51 nearer the plane of symmetry α giving rise to a differential radial displacement of the radial end of the high thermal expansion elements 52; said displacement accumulates for each pair of elements 51, 52 until resulting in a radial displacement ε.

The bolts 54 engage with precision in the closing elements 53, whereas to allow radial expansion of the expander 50, they engage with the other elements 51, 52 and with the radial extension 55 with gradually increasing play as they approach the plane of symmetry α.

The elastic element 57, inserted in a groove of the radial extension 55 and acting on a bolt 54, allows radial compacting of the expander 50 as the temperature decreases also in the absence of forcing on the part of adjacent elements. When cold, the expanders are mounted so as to maintain their projection within the horizontal projection of the outline of the fuel elements 12 and protrude from said projection only when, at high temperature, they are required to function.

In operating conditions of the reactor, the heads 16 of the fuel elements are practically isothermal with the support structure 11 because they are immersed in the reactor covering gas 58 above the free levels H1, H2 of the primary coolant of the reactor inside the vessel 2 and therefore always maintained rigidly in position. The feet 15 of the fuel elements are at the temperature of the cold manifold 7 and at the same temperature as the inner rim 20 of the opening 21 of the hydraulic separation structure 5 and therefore they can be mounted with narrow tolerances, eliminating the play due also to the structural elasticity of the feet 15. The assembly play is minimized also at the upper grid 59 supporting the fuel rods 60. The fuel element is therefore always radially secured on the head at the top and on the foot at the bottom and is free to thermally expand downwards. As the power increases, the fuel element expands radially more at the grid 59 than at the foot 15. Said differential expansion accumulates from the centre towards the outside of the core and is made possible (i) by the rotation of the foot 15 around its radial constraints consisting of the point of contact 61 with the feet 15 of the adjacent elements and/or with the inner rim 20 of the opening 21, (ii) by the rotation of the shaft 17 of the fuel element 12 with respect to the head 16 by means of the spherical coupling 19, (iii) by the inflexion of the shaft 17. The fuel elements 12 are mounted alongside the grid 59 (FIG. 6a) and remain positioned alongside said grid 59 also during normal operation of the reactor, with expanders 50 spaced, whereas in an accident situation, when a predetermined temperature is exceeded, the greater radial expansion of the expanders 50 interlocks them (FIG. 6b) and amplifies the radial expansion of the core by a predetermined value δ according to the temperature.

In short, the core 4 expands by means of rotation of the feet 15 of the fuel elements 12, positioned at respective lower axial ends of the fuel elements 12, while the heads 16 of the fuel elements 12, positioned at respective upper axial ends of the fuel elements 12, remain substantially stationary.

Since the core must never be radially slack, the intervention on the expanders 50 must always be countered by elastic elements that re-set the core to a compact configuration when cooling terminates the intervention of the expanders 50; in the example indicated, the elastic element consists of the shaft 17 of the fuel element 12.

Figure 7:
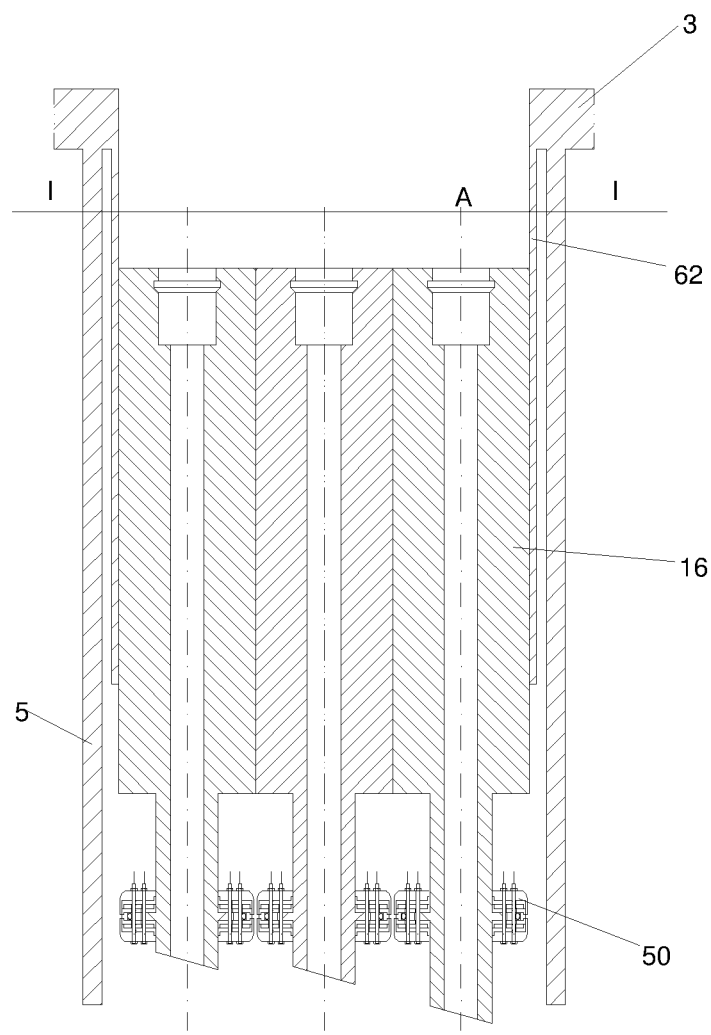
FIG. 7 is a schematic view in longitudinal section of the upper part of the fuel elements of the nuclear reactor of FIG. 1 provided with expanders and interacting with elastic radial constraint elements.
Figure 8:
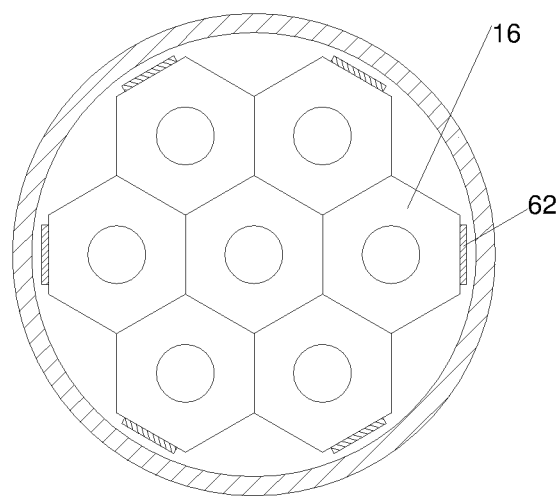
FIG. 8 is a schematic view in cross section according to trace I-I of the radial constraint system of the fuel elements of FIG. 7.

With reference in particular to FIGS. 7 and 8, an example is shown of application of extenders 50 to rigid fuel elements anchored at the bottom on a grid not shown since it is a known solution.

The heads 16 of the fuel elements are radially constrained by flexible containing elements 62 containing the core connected to the closing structure 3. When the heads 16 of the fuel elements 12 are spaced from one another by thermal expansion of the expanders 50, the flexible elements 62 continue to radially clamp the core 4, preventing vibration.

With a rigid fuel element 12, the radial elastic element can be obtained also according to other construction solutions, for example flexible containing elements containing the core 4 connected to the bottom part of the hydraulic separation structure 5 or elastic return elements interposed between said heads 16 of the fuel elements 12, not described in detail in view of the plurality of possible embodiments.

From the above, the advantages of the present invention are evident.

The expanders 50 which, in normal reactor operating conditions do not engage with each other and do not alter the normal temperature counter reactions of the core, but which when the core output temperature exceeds a predetermined reference value amplify the radial expansion of the core and the associated negative counter-reaction of the reactivity, introduce an important safety factor into the design of the core.

Given their geometry and axial-symmetric operation, the expanders do not have a predetermined direction to be observed in the assembly phase, nor do they preclude the possibility of rotation of the fuel element during the refueling phases.

The flexible elements 17, 62 provided to permit expansion of the core also allow elimination of the play between fuel elements 12 to maintain the core 4 compact and eliminate the risks of vibration with associated variations in reactivity.

Refueling is facilitated by the presence of flexible elements 17, 62.

The presence of releasable horizontal support devices 24 allows advantageous use of the play between the heads of the fuel elements during refueling operations.

The invention claimed is:

1. A nuclear reactor, comprising:
a vessel that houses a core immersed in a primary fluid in the vessel for cooling the core, the core including a bundle of fuel elements that extend along respective parallel longitudinal axes and that are each provided with an active part, a head, and, between the active part and the head, expanders arranged radially in a direction perpendicular to the respective parallel longitudinal axes;
wherein the expanders each include low thermal expansion elements, high thermal expansion elements alternating vertically with the low thermal expansion elements such that each high thermal expansion element is vertically interposed between two low thermal expansion elements, a terminal closing element covering the low thermal expansion elements and the high thermal expansion elements, and a fastening member axially securing the low thermal expansion elements and the high thermal expansion elements to the terminal closing element, the low thermal expansion elements being made of a first material having a first thermal expansion coefficient and the high thermal expansion elements being made of a second material having a second thermal expansion coefficient greater than the first thermal expansion coefficient;

wherein the low thermal expansion elements alternately engage with the high thermal expansion elements to amplify radial expansion of terminal parts of the expanders which, when a predetermined temperature is exceeded, shift laterally relative to each other to space the fuel elements from one another and radially expand the core;

wherein each fuel element of the bundle of fuel elements is provided with a plurality of expanders that project radially from a shaft of the fuel element and are angularly spaced around the respective parallel longitudinal axis of the fuel element; and wherein the low thermal expansion elements are Z-shaped and the high thermal expansion elements are in the shape of a parallelepiped.

2. The nuclear reactor of claim 1, wherein each head of the bundle of fuel elements includes multiple peripheral faces and each fuel element of the bundle of fuel elements is provided with a number of expanders equal to a number of the multiple peripheral faces of the head of the fuel element.

3. The nuclear reactor of claim 1, wherein for each fuel element of the bundle of fuel elements, radial expansion of the expanders flexes the shaft of the fuel element and spaces the active parts of the fuel elements, thereby expanding the core by radially moving respective feet of the fuel elements, positioned at respective lower axial ends of the fuel elements, while respective heads of the fuel elements, positioned at respective upper axial ends of the fuel elements, remain substantially stationary.

4. The nuclear reactor of claim 1, wherein expansion of the expanders spaces the fuel elements, thereby expanding the core by rotation of the fuel elements around respective feet of the fuel elements effective to radially move the respective feet, positioned at respective lower axial ends of the fuel elements, with respective heads of the fuel elements positioned at respective upper axial ends of the fuel elements and spaced from one another; said head of each one of the fuel elements being radially constrained by flexible containment elements.

5. The nuclear reactor of claim 1, wherein each one of the expanders extends perpendicular to the respective parallel longitudinal axis of the respective fuel element.

6. The nuclear reactor of claim 1, wherein each one of the expanders includes a terminal closing element that covers the low thermal expansion elements and the high thermal expansion elements and projects radially to an outside of the low thermal expansion elements and the high thermal expansion elements.

7. The nuclear reactor of claim 1, wherein:

for each expander of the plurality of expanders, the shaft of each of the fuel elements includes a radial extension that projects radially from the shaft and has a radially external end and a radially internal end joined to the shaft opposite to the radially external end;

the low thermal expansion elements include a first low thermal expansion element having an axially bent radially external terminal part engaged with the radial extension and a radially internal end;

the high thermal expansion elements include a first high thermal expansion element having a radially internal end engaged with the radially internal end of the first low thermal expansion element and a radially external end engaged with a radially external terminal part of a second low thermal expansion element.

8. A nuclear reactor, comprising:

a vessel that houses a core immersed in a primary fluid in the vessel for cooling the core, the core including a bundle of fuel elements that extend along respective parallel longitudinal axes and that are each provided with an active part, a head, and, between the active part and the head, expanders arranged radially in a direction perpendicular to the respective parallel longitudinal axes;

wherein the expanders each include low thermal expansion elements, high thermal expansion elements alternating vertically with the low thermal expansion elements such that each high thermal expansion element is vertically interposed between two low thermal expansion elements, a terminal closing element covering the low thermal expansion elements and the high thermal expansion elements, and a fastening member axially securing the low thermal expansion elements and the high thermal expansion elements to the terminal closing element, the low thermal expansion elements being made of a first material having a first thermal expansion coefficient and the high thermal expansion elements being made of a second material having a second thermal expansion coefficient greater than the first thermal expansion coefficient;

wherein the low thermal expansion elements alternately engage with the high thermal expansion elements to amplify radial expansion of terminal parts of the expanders which, when a predetermined temperature is exceeded, shift laterally relative to each other to space the fuel elements from one another and radially expand the core;

wherein each fuel element of the bundle of fuel elements is provided with a plurality of expanders that project radially from a shaft of the fuel element and are angularly spaced around the respective parallel longitudinal axis of the fuel element; and wherein each one of the expanders includes a terminal closing element that covers the low thermal expansion elements and the high thermal expansion elements and projects radially to an outside of the low thermal expansion elements and the high thermal expansion elements.

9. The nuclear reactor of claim 8, wherein the low thermal expansion elements are Z-shaped and the high thermal expansion elements are in the shape of a parallelepiped.

10. The nuclear reactor of claim 8, wherein:

for each expander of the plurality of expanders, the shaft of each of the fuel elements includes a radial extension that projects radially from the shaft and has a radially external end and a radially internal end joined to the shaft opposite to the radially external end;

the low thermal expansion elements include a first low thermal expansion element having an axially bent radially external terminal part engaged with the radial extension and a radially internal end;

the high thermal expansion elements include a first high thermal expansion element having a radially internal end engaged with the radially internal end of the first low thermal expansion element and a radially external end engaged with a radially external terminal part of a second low thermal expansion element.

11. A nuclear reactor, comprising:
a vessel that houses a core immersed in a primary fluid in the vessel for cooling the core, the core including a bundle of fuel elements that extend along respective parallel longitudinal axes and that are each provided with an active part, a head, and, between the active part and the head, expanders arranged radially in a direction perpendicular to the respective parallel longitudinal axes;
wherein the expanders each include low thermal expansion elements, high thermal expansion elements alternating vertically with the low thermal expansion elements such that each high thermal expansion element is vertically interposed between two low thermal expansion elements, a terminal closing element covering the low thermal expansion elements and the high thermal expansion elements, and a fastening member axially securing the low thermal expansion elements and the high thermal expansion elements to the terminal closing element, the low thermal expansion elements being made of a first material having a first thermal expansion coefficient and the high thermal expansion elements being made of a second material having a second thermal expansion coefficient greater than the first thermal expansion coefficient;
wherein the low thermal expansion elements alternately engage with the high thermal expansion elements to amplify radial expansion of terminal parts of the expanders which, when a predetermined temperature is exceeded, shift laterally relative to each other to space the fuel elements from one another and radially expand the core;
wherein each fuel element of the bundle of fuel elements is provided with a plurality of expanders that project radially from a shaft of the fuel element and are angularly spaced around the respective parallel longitudinal axis of the fuel element;
wherein for each expander of the plurality of expanders, the shaft of each of the fuel elements includes a radial extension that projects radially from the shaft and has a radially external end and a radially internal end joined to the shaft opposite to the radially external end;
wherein the low thermal expansion elements include a first low thermal expansion element having an axially bent radially external terminal part engaged with the radial extension and a radially internal end;
wherein the high thermal expansion elements include a first high thermal expansion element having a radially internal end engaged with the radially internal end of the first low thermal expansion element and a radially external end engaged with a radially external terminal part of a second low thermal expansion element.

12. The nuclear reactor of claim 11, wherein the low thermal expansion elements are Z-shaped and the high thermal expansion elements are in the shape of a parallelepiped.

13. The nuclear reactor of claim 11, wherein each one of the expanders includes a terminal closing element that covers the low thermal expansion elements and the high thermal expansion elements and projects radially to an outside of the low thermal expansion elements and the high thermal expansion elements.

* * * * *